US008804651B2

(12) United States Patent
Li et al.

(10) Patent No.: US 8,804,651 B2
(45) Date of Patent: Aug. 12, 2014

(54) METHOD AND DEVICE FOR GENERATING DEMODULATION REFERENCE SIGNAL SEQUENCES

(71) Applicant: Huawei Technologies Co., Ltd., Guangdong (CN)

(72) Inventors: Yang Li, Beijing (CN); Mingyu Zhou, Beijing (CN); Yuan Xia, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 13/729,045

(22) Filed: Dec. 28, 2012

(65) Prior Publication Data

US 2013/0114547 A1 May 9, 2013

Related U.S. Application Data

(63) Continuation of application No. PCT/CN2011/070433, filed on Jan. 20, 2011.

(30) Foreign Application Priority Data

Jun. 28, 2010 (CN) .......................... 2010 1 0217558

(51) Int. Cl.
 H04W 4/00 (2009.01)
(52) U.S. Cl.
 USPC .......................................... 370/329; 455/450
(58) Field of Classification Search
 None
 See application file for complete search history.

(56) References Cited

U.S. PATENT DOCUMENTS

2011/0142107 A1* 6/2011 Pan et al. ...................... 375/219
2011/0158191 A1* 6/2011 Zhang et al. .................. 370/329
2011/0200135 A1* 8/2011 Sorrentino et al. ........... 375/295
2011/0235599 A1* 9/2011 Nam et al. ..................... 370/329
2011/0243066 A1* 10/2011 Nayeb Nazar et al. ....... 370/328
2012/0014318 A1* 1/2012 Luo et al. ...................... 370/328

(Continued)

FOREIGN PATENT DOCUMENTS

CN 101384078 A 3/2009
CN 101741462 A 6/2010

(Continued)

OTHER PUBLICATIONS

Ericsson, ST-Ericsson ,"Uplink DM-RS Resource Configuration for LTE-Advanced",3GPP TSG RAN WG1 Meeting #60,R1-101008,San Francisco, USA, Feb. 22-26, 2010,Total 5 pages.

(Continued)

Primary Examiner — Brian Roberts
(74) Attorney, Agent, or Firm — Huawei Technologies Co., Ltd

(57) ABSTRACT

The embodiments of the present invention disclose resource configuration methods and devices of a demodulation reference signal. The method includes determining the first number of a first transmission layers of a user equipment (UE) for transmitting uplink data; selecting a combination of a Cyclic Shift (CS) resource and an Orthogonal Cover Code (OCC) sequence from one combination item according to the first number of the first transmission layers for each of the first transmission layers; wherein the one combination item is among a plurality of predetermined combination items, each of the plurality of predetermined combination items comprises the second number of predetermined CS resources and OCC sequences respectively corresponding to the maximum number of transmission layers supportable by the communication system. The solutions of the present invention can simplify the complexity of a protocol describing the DMRS resource configurations, and is helpful for reducing inter-codeword DMRS interferences.

24 Claims, 3 Drawing Sheets

(56) References Cited

U.S. PATENT DOCUMENTS

| | | | |
|---|---|---|---|
| 2012/0170683 A1* | 7/2012 | Frederiksen et al. | 375/308 |
| 2012/0243500 A1* | 9/2012 | Chandrasekhar et al. | 370/330 |
| 2013/0343334 A1 | 12/2013 | Papasakellariou | |

FOREIGN PATENT DOCUMENTS

| | | |
|---|---|---|
| JP | 2012147134 A | 8/2012 |
| JP | 2013515427 A | 5/2013 |
| WO | 2011102782 A1 | 8/2011 |

OTHER PUBLICATIONS

International search report for International application No. PCT/CN2011/070433, dated Apr. 28, 2011, total 4 pages.

Nokia Siemens Networks, Nokia,"On OCC based DM RS structure",3GPP TSG RAN WG1 Meeting #60bis , R1-101907,Beijing,China, Apr. 12-16, 2010 ,total 6 pages.

Qualcomm Incorporated,"DM-RS in support of UL spatial multiplexing",3GPP TSG-RAN WG1 #60bis ,R1-102340, Apr. 12-16, 2010,Beijing, China,total 5 pages.

Written opinion issued in corresponding to PCT application No. PCT/CN2011/070433,dated Apr. 28, 2011,total 8 pages.

Search report issued in corresponding to Chinese application No. 201010217558.7,dated Aug. 2, 2012,and an English translation thereof, total 10 pages.

Office action issued in corresponding to Chinese application No. 201010217558.7,dated Oct. 11, 2012,and an English translation thereof,total 19 pages.

3GPP TSG RAN WG1 #59b1s meeting R1-100788,"Uplink DM-RS design",Mitsubishi Electric,Jan. 18-22, 2010,total 4 pages.

3GPP TSG RAN WG1 M eeting #60-bis R1-102407,"Considerations on Uplink DM-RS design for LTE-Advaneed", Pantecb,Apr. 2010,total 6 pages.

3GPP TSG RAN WG1 Meeting #61 bis R1-103944,"PHICH Mapping for UL SU-MIMO",Motorola,Jun. 28-Jul. 3, 2010, total 4 pages.

Search report issued in corresponding European application No. 11732692.6,dated Jun. 3, 2013,total 11 pages.

3GPP TSG RAN WG1 Meeting #60 R1-101075,"Impacts of OCC on UL DM RS for LTE-A",Huawei, Feb. 22-26, 2010,total 7 pages.

3GPP TSG RAN WG1 Meeting #62 R1-104454,"Remaining detail on UL DM RS",Nokia Siemens Networks,Nokia, Aug. 2010,total 5 pages.

3GPP TSG RAN WG1 Meeting #62 R1-104523,"Design of OCC CS Mapping for UL DMRS",Sharp,Aug. 23-27, 2010,total 3 pages.

3GPP TSG RAN WG1 Meeting #62 R1-104906,"OCC and CS for UL DMRS in SU MU-MIMO",Panasonic,Aug. 23-27, 2010,total 5 pages.

3GPP TSG RAN WG1 Meeting #62 R1-105142,"Remaining details of OCC CS mapping",Huawei,Oct. 11-15, 2010,total 5 pages.

3GPP TSG RAN WG1 Meeting #62-bis R1-105306,"OCC Configuration of Uplink DM-RS in LTE-Advanced",Pantech, Oct. 11-15, 2010,total 5 pages.

3GPP TSG RAN WG1 #62bis meeting R1-105637,"OCC mapping for uplink DM-RS",Mitsubishi Electric,Oct. 11-15, 2010,total 3 pages.

* cited by examiner

METHOD AND DEVICE FOR GENERATING DEMODULATION REFERENCE SIGNAL SEQUENCES

CROSS-REFERENCE TO RELATED APPLICATIONS

This application is a continuation of International Application No. PCT/CN2011/070433, filed on Jan. 20, 2011, which claims priority to Chinese Patent Application No. 201010217558.7, filed on Jun. 28, 2010. Both of the aforementioned patent applications are hereby incorporated by reference in their entireties.

TECHNICAL FIELD

The present invention relates to the field of telecommunications technology, in particular to a resource configuration method and a device for generating a demodulation reference signal sequence.

BACKGROUND

In a Long Term Evolution (LTE) system defined by Third Generation Partnership Project (3GPP), an uplink data transmission normally uses a demodulation reference signal (DMRS) for channel estimation.

A base station allocates a physical resource block (PRB) or a plurality of PRBs for transmitting uplink data for each User Equipment (UE) which needs to transmit uplink data. The minimum granularity of resource mapping is referred to as a resource element (RE), and the resources for carrying the DMRS are located within a PRB that the base station allocates to the UE for transmitting uplink data. For example, a pilot frequency structure of an uplink DMRS as defined in Long Term Evolution (LTE) Rel-8 is shown in FIG. 1. A sub-frame, which is divided into two slots, consists of 14 symbols, and each slot contains 7 symbols. Within each allocated PRB, the resource element carrying the DMRS occupies the fourth and the eleventh symbols, i.e., the symbols in the middle of each slot. A DMRS sequence may be generated by cyclically shifting a Constant Amplitude Zero Auto-Correlation (CAZAC) sequence. Different CAZAC sequences generate different DMRS sequences. The base station informs a UE about the cyclic shift (CS) used for generating the DMRS sequence through a control signaling, and the UE generates the DMRS sequence in accordance with the control signaling.

In a LTE-Advance (LTE-A) system, to further increase the uplink transmission rate of a UE, uplink Multiple Input Multiple Output (MIMO) transmission is introduced. The UE may perform a multi-layer spatial multiplex transmission through precoding. To support the multi-layer transmission, the base station needs to allocate a DMRS sequence for each transmission layer of the UE. The DMRS sequences are orthogonal to each other. In order not to increase complexity to system design, the respective DMRS sequences of the transmission layers may occupy the same time-frequency resources. That is, the DMRS time-frequency pattern as defined by LTE Rel-8 is still used, and code division orthogonality is achieved by configuring different CSs for generating the DMRS sequences.

For Multi-User-MIMO (MU-MIMO) scheduling, that is, at least two UEs are paired for transmission, if the PRB resources allocated by the base station to the paired UEs are not aligned, the lengths of the DMRS sequences used by the paired UEs may be different. DMRS sequences of different lengths cannot achieve code division orthogonality merely through CS. To ensure the orthogonality between the DMRS sequences of MU-MIMO UEs with allocated non-aligned PRB resources, the LTE-A system introduces an Orthogonal Cover Code (OCC) sequence-based code division mode, i.e. besides allocating for each UE a CS for generating a DMRS sequence, an OCC sequence will also be allocated to the UE to act on the DMRS sequence in the two slots of a PRB, and the OCC sequences for the UEs are different.

The OCC sequences can be $\{1, 1\}$ and $\{1, -1\}$. It is assumed that UE1 and UE2 are paired UEs scheduled for MU-MIMO, sequence $\{1, 1\}$ is allocated to UE1, and sequence $\{1, -1\}$ is allocated to UE2. Within the first slot of a certain PRB, UE1 and UE2 each multiplies a DMRS sequence generated after the cyclic shift with the first bit of its OCC sequence, respectively, and within the second slot, multiplies the DMRS sequence generated after the cyclic shift with the second bit of its OCC sequence, respectively. In such case, to achieve the orthogonality, the CSs used by each UE within the two slots of the PRB are the same, that is, the UE does not carry out a sequence group hopping between the slots. The OCC sequence can also be used to strengthen the orthogonality among DMRS sequences of multiple layers. In an LTE-A system, OCC sequences can also be used for DMRS orthogonality in single UE MIMO. That is, different OCC sequences can be allocated to different transmission layers of a single UE. In such case, a control signaling delivered by the base station is needed to inform the UE about the CS and the OCC sequence used for generating the respective DMRS sequences of the transmission layers.

Current R1-101008 proposal presents multiple combinational configuration items of the CS and the OCC sequence that can be applied in generation of DMRS sequences, wherein different combinational configuration items of the CS and OCC sequence can be set corresponding to different numbers of the transmission layers of a UE. The multiple combinational configuration items based on different rank values, which are presented by the R1-101008 proposal, are specifically shown in Table 1, DMRS resource configuration table.

TABLE 1

| DMRS Resource Configuration Table | | | | | | | | |
|---|---|---|---|---|---|---|---|---|
| DMRS Resource | Rank = 1 | | Rank = 2 | | Rank = 3 | | Rank = 4 | |
| configuration number | CS | OCC sequence | CS | OCC sequence | CS | OCC sequence | CS | OCC sequence |
| 0 | 0 | $\{1, 1\}$ | 0, 6 | $\{1, -1\}, \{1, -1\}$ | 0, 4, 8 | $\{1, -1\}, \{1, 1\}, \{1, -1\}$ | 0, 3, 6, 9 | $\{1, -1\}, \{1, 1\}, \{1, -1\}, \{1, 1\}$ |
| 1 | 1 | $\{1, -1\}$ | 1, 7 | $\{1, -1\}, \{1, -1\}$ | 1, 5, 9 | $\{1, 1\}, \{1, -1\}, \{1, -1\}$ | 1, 4, 7, 10 | $\{1, 1\}, \{1, -1\}, \{1, 1\}, \{1, -1\}$ |

TABLE 1-continued

DMRS Resource Configuration Table

| DMRS Resource configuration number | Rank = 1 | | Rank = 2 | | Rank = 3 | | Rank = 4 | |
|---|---|---|---|---|---|---|---|---|
| | CS | OCC sequence | CS | OCC sequence | CS | OCC sequence | CS | OCC sequence |
| 2 | 3 | {1, 1} | 3, 9 | {1, −1}, {1, −1} | 2, 6, 10 | {1, −1}, {1, 1}, {1, −1} | 2, 5, 8, 11 | {1, −1}, {1, 1}, {1, −1}, {1, 1} |
| 3 | 5 | {1, −1} | 5, 11 | {1, −1}, {1, −1} | 0, 4, 8 | {1, 1}, {1, −1}, {1, 1} | 0, 3, 6, 9 | {1, 1}, {1, 1}, {1, 1}, {1, 1} |
| 4 | 6 | {1, 1} | 6, 0 | {1, 1}, {1, 1} | 1, 5, 9 | {1, −1}, {1, −1}, {1, −1} | 1, 4, 7, 10 | {1, −1}, {1, −1}, {1, −1}, {1, −1} |
| 5 | 7 | {1, −1} | 7, 1 | {1, 1}, {1, 1} | 2, 6, 10 | {1, 1}, {1, 1}, {1, 1} | 2, 5, 8, 11 | {1, −1}, {1, −1}, {1, −1}, {1, −1} |
| 6 | 9 | {1, 1} | 9, 3 | {1, 1}, {1, 1} | 3, 7, 11 | {1, −1}, {1, −1}, {1, −1} | | |
| 7 | 11 | {1, −1} | 11, 5 | {1, 1}, {1, 1} | 3, 7, 11 | {1, 1}, {1, −1}, {1, 1} | | |

In Table 1, Rank denotes the number of transmission layers of a UE for transmitting uplink data. The example shown in Table 1, assumes that the system can support up to four transmission layers, the base station selects the combinational configurations of CS and OCC sequence allocated to the UE according to Table 1, and informs the UE of the rank values and the DMRS resource configuration number. The UE searches the preset Table 1 according to the informed rank value and the DMRS resource configuration number, and acquires the corresponding combinational configuration of the CS and OCC sequence resource for generating the DMRS sequence as allocated by the base station.

It is found that, in the current DMRS resource configuration method, the combinational configuration items of the CS and OCC sequence resources established corresponding to different rank values are independent from each other, which to some extent increases the complexity for defining system specifications.

SUMMARY

Embodiments of the present invention provide a method and a device for configuring resources for a demodulation reference signal. The method can reduce the complexity of describing in the specifications the combinational configuration of the CS and OCC sequences that are used for generating DMRS sequences, and can reduce the DMRS interference between codewords.

In a first aspect, a resource configuration method for generating a demodulation reference signal is provided. The method includes:

determining number of transmission layers of a User Equipment (UE) for transmitting uplink data;

selecting, based on the determined number of transmission layers, a combinational configuration of a CS resource and an OCC sequence that is used for generating respective DMRS sequences of the transport layers of the UE for transmitting uplink data, from one of preset multiple combinational configuration items of CS and OCC sequence resources, where the combinational configuration items are set with respect to the maximum number of transmission layers supportable by the system and are usable for generating respective DMRS sequences of transmission layers, and where a first configuration condition is satisfied among the several items of preset combinational configuration items, and the first configuration condition includes that different OCC sequences are configured among the combinational configuration items which are configured with at least two same CS resources;

generating a control signaling and delivering the control signaling to the UE, where the control signaling contains configuration indication information, and the configuration indication information indicates the selected combinational configuration of the CS and OCC sequence that is used for generating respective DMRS sequences of the transmission layers of the UE for transmitting uplink data.

In a second aspect, another resource configuration method for generating a demodulation reference signal is provided. The method includes:

receiving a control signaling containing configuration indication information delivered by an access network device, where the configuration indication information indicates a combinational configuration of CS and OCC sequence resources that is used for generating respective DMRS sequences of transmission layers of the UE for transmitting uplink data, the combination configuration is selected by the access network device, based on a determined number of transmission layers of the UE for transmitting uplink data, from one of preset multiple combinational configuration items of CS and OCC sequence, and the multiple combinational configuration items are set with respect to the maximum number of transmission layers supportable by the system, and are usable for generating DMRS sequences of respective transmission layers;

determining, the combinational configuration of CS and OCC sequence from preset multiple combinational configuration items of CS and OCC sequence according to the configuration indication information, where the combinational configuration is selected by the access network device and is used for generating respective DMRS sequences of transmission layers of the UE for transmitting uplink data, and the combinational configuration items are set with respect to the maximum number of transmission layers supportable by the system and are usable for generating respective DMRS sequences of transmission layers;

generating the respective DMRS sequences of the transmission layers of the UE for transmitting uplink data by using CS and OCC sequence resources corresponding to the determined combinational configuration.

In a third aspect, an access network device is provided. The access network device includes:

a determination unit, configured to determine the number of transmission layers of a UE for transmitting uplink data;

a configuration selection unit, configured to select, based on the number of transmission layers determined by the determination unit, a combinational configuration of CS and OCC sequence that is used for generating respective DMRS sequences of the transmission layers of the UE for transmitting uplink data, from one of preset multiple combinational configuration items of CS and OCC sequence, where the combinational configuration items are set with respect to the maximum number of transmission layers supportable by the system and are used for generating respective DMRS sequences of transmission layers, and where a first configuration condition is satisfied among the preset combinational configuration items, and the first configuration condition includes that each of combinational configuration items containing at least two same CS resource configurations uses different OCC sequence resource configurations;

an indication unit, configured to generate control signaling and deliver the control signaling to the UE, where the control signaling contains configuration indication information, and the configuration indication information indicates the combinational configuration of the CS and OCC sequence that is selected by the configuration selection unit and is used for generating respective DMRS sequences of the transmission layers of the UE for transmitting uplink data.

In a fourth aspect, a user equipment (UE) is provided. The UE includes:

a reception unit, configured to receive control signaling containing configuration indication information delivered by an access network device, where the configuration indication information indicates a combinational configuration of CS and OCC sequence that is used for generating respective DMRS sequences of transmission layers of a UE for transmitting uplink data, the combination configuration is selected by the access network device, based on a determined number of transmission layers of the UE for transmitting uplink data, from one of preset multiple combinational configuration items of CS and OCC sequence, and the combinational configuration items are set with respect to the maximum number of transmission layers supportable by the system and are used for generating respective DMRS sequences of transmission layers;

a configuration determination unit, configured to determine the combinational configuration of CS and OCC sequence from preset multiple combinational configuration items of CS and OCC sequence according to the configuration indication information contained in the control signaling received by the reception unit, where the combinational configuration is selected by the access network device and is used for generating respective DMRS sequences of transmission layers of the UE for transmitting uplink data, and the combinational configuration items are set with respect to the maximum number of transmission layers supportable by the system and are used for generating respective DMRS sequences of transmission layers;

a generation unit, configured to generate the respective DMRS sequences of the transmission layers of the UE for transmitting uplink data by using CS and OCC sequence corresponding to the combinational configuration determined by the configuration determination unit.

In a fifth aspect, a computer program product is provided for use in an access network device The computer program product includes a computer readable storage medium configured to store program codes executable by the access network device. The program codes include:

a first code, configured to trigger a computer to determine the number of transmission layers of User Equipment (UE) for transmitting uplink data;

a second code, configured to trigger a computer to trigger a computer to select, based on the determined number of transmission layers, a combinational configuration of Cyclic Shift (CS) and Orthogonal Cover Code (OCC) sequence that is used for generating respective Demodulation Reference Signal (DMRS) sequences of the transmission layers of the UE for transmitting uplink data, from one of preset multiple combinational configuration items of CS and OCC sequence, where the combinational configuration items are set with respect to the maximum number of transmission layers supportable by the system and are used for generating respective DMRS sequences of transmission layers, and where a first configuration condition is satisfied among the preset combinational configuration items, and the first configuration condition includes that each of combinational configuration items containing at least two same CS resource configurations uses different OCC sequence resource configurations;

a third code, configured to trigger a computer to generate control signaling and deliver the control signaling to the UE, where the control signaling contains configuration indication information, and the configuration indication information indicates the selected combinational configuration of the CS and OCC sequence that is used for generating respective DMRS sequences of the transmission layers of the UE for transmitting uplink data.

In a sixth aspect, a computer program product is provided for use in device user equipment. The computer program product includes a computer readable storage medium configured to store program codes executable by the user equipment. The program codes include:

a first code, configured to trigger a computer to receive control signaling containing configuration indication information delivered by an access network device, where the configuration indication information indicates a combinational configuration of Cyclic Shift (CS) and Orthogonal Cover Code (OCC) sequence resources that is used for generating respective Demodulation Reference Signal (DMRS) sequences of transmission layers of User Equipment (UE) for transmitting uplink data, the combination configuration is selected by the access network device, based on a determined number of transmission layers of the UE for transmitting uplink data, from one of preset multiple combinational configuration items of CS and OCC sequence, and the combinational configuration items are set with respect to the maximum number of transmission layers supportable by the system and are used for generating respective DMRS sequences of transmission layers;

a second code, configured to trigger a computer to determine the combinational configuration of CS and OCC sequence from preset multiple combinational configuration items of CS and OCC sequence according to the configuration indication information contained in the control signaling received by the reception unit, where the combinational configuration is selected by the access network device and is used for generating respective DMRS sequences of transmission layers of the UE for transmitting uplink data, and the combinational configuration items are set with respect to the maximum number of transmission layers supportable by the system and are used for generating respective DMRS sequences of transmission layers;

a third code, configured to trigger a computer to generate the respective DMRS sequences of the transmission layers of the UE for transmitting uplink data by using CS and OCC sequence corresponding to the combinational configuration determined by the configuration determination unit.

In a seventh aspect, a computer readable storage medium is provided. The storage medium can be implemented in an access network device or a user equipment in a communication system. The storage medium is configured to store a plurality of preset combinational configurations of CS and OCC sequence, where the combinational configuration items are set with respect to the maximum number of transmission layers supportable by the system and are used for generating respective DMRS sequences of transmission layers, and where a first configuration condition is satisfied among the preset combinational configuration items, and the first configuration condition includes that each of combinational configuration items containing at least two identical CS resource configurations uses different OCC sequence resource configurations.

It can be seen from the above that, the embodiments of the present invention can preset merely multiple combinational configuration items of CS and OCC sequence with respect to the maximum number of transmission layers supportable by the system, where the combinational configuration items are used for generating respective DMRS sequences of transmission layers; and the combinational configuration items of CS and OCC sequence used for generating respective DMRS sequences of transmission layers of the UE for transmitting uplink data is a configuration subset of one of the preset multiple combinational configuration items. This implementation mode can simplify the complexity of describing in standardization about generating combinational configurations of CS and OCC sequence resources usable for generating DMRS sequences, and is relatively easy for standardization and systematic implementation. Setting configuration conditions for the configuration modes of CS and OCC sequence resources in respective preset combinational configuration items is beneficial to reducing the inter-codeword DMRS interference.

BRIEF DESCRIPTION OF THE DRAWINGS

In the following, drawings to be used for explaining the embodiments of the invention or the prior arts are briefly described to explain the technical solutions of the embodiments of the present invention or of the prior arts more clearly. Obviously, the drawings as described in the following illustrate merely some embodiments of the present invention. For those skilled in the art, other drawings are readily obtainable in accordance with these drawings, without any creative effort.

DETAILED DESCRIPTION OF THE EMBODIMENTS

The embodiments of the present invention provide a method and a device for configuring resources for a demodulation reference signal. The method can reduce the complexity of describing in the specification about the combinational configuration of CS and OCC sequences that are used for generating a DMRS sequence, and can reduce the DMRS interferences between codewords.

To make the purpose, characteristics and benefits of the present invention clearer and easier to understand, the following makes references to the figures of the embodiments of the present invention to clearly describe the technical solutions of the embodiments of the present invention. Apparently, the embodiments described herein are merely a part, but not all, of the embodiments of the present invention. All other embodiments made without any creative effort by a person of ordinary skill in the art, based on the embodiments of the present invention, fall within the protection scope of the present invention.

First Embodiment

In the following, an embodiment of the present invention pertaining to the resource configuration method for generating a demodulation reference signal sequence is described from the aspect of an access network device in a communication system. The method includes:

determining the number of transmission layers of a User Equipment (UE) for transmitting uplink data; selecting, based on the determined number of transmission layers, a combinational configuration of a Cyclic Shift (CS) sequence and an Orthogonal Cover Code (OCC) sequence for generating a Demodulation Reference Signal (DMRS) sequence for each of the transmission layers of the UE. The combinational configuration is selected from one combinational configuration item, which is among a plurality of preset combinational configuration items of the CS and OCC sequence with respect to a maximum number of transmission layers supported by the system and are usable for generating respective DMRS sequences of the transmission layers. A first configuration condition is satisfied among the preset combinational configuration items, and the first configuration condition is such that the OCC sequences in the at least two of the predetermined combinational configuration items having the same CS resources are different. A control signaling is generated and delivered to the UE, wherein the control signaling contains configuration indication information, and the configuration indication information indicates the selected combinational configurations of the CS and OCC sequence resources that is used for generating respective DMRS sequences of the transmission layers of the UE for transmitting uplink data.

Figure 1:
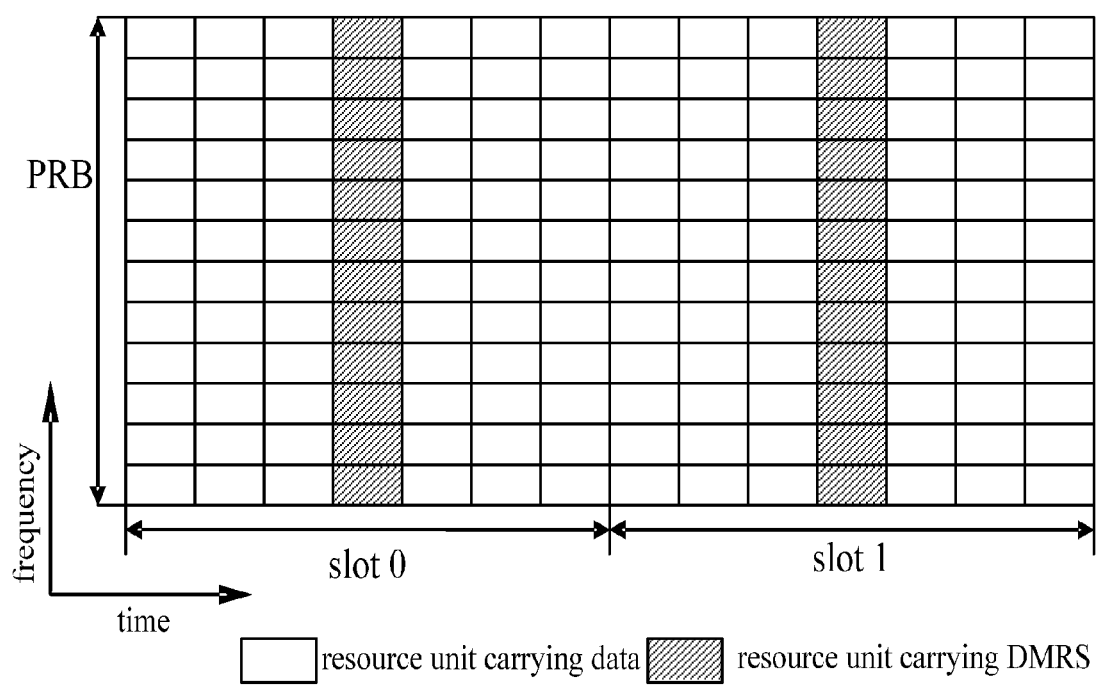
FIG. 1 is a schematic diagram of the pilot frequency structure of an uplink DMRS according to LTE Rel-8.
Figure 2:
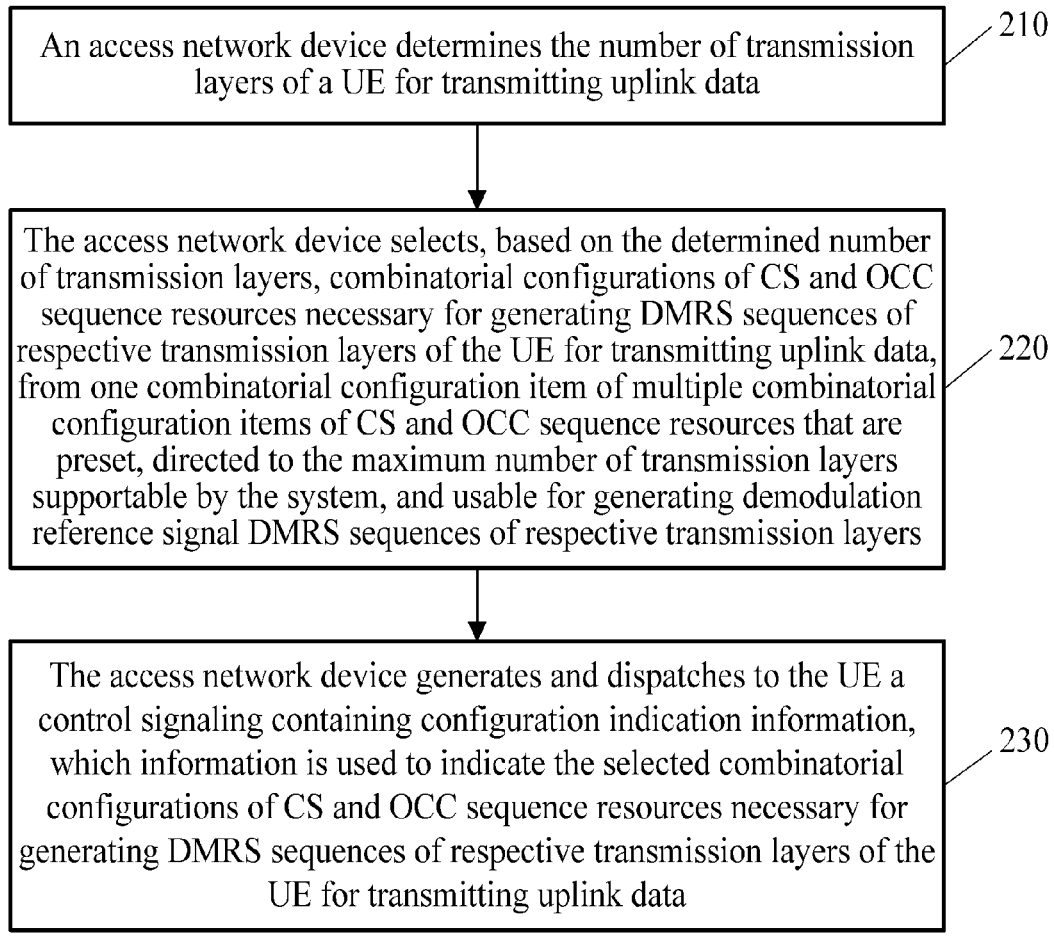
FIG. 2 is a flowchart of a resource configuration method for a demodulation reference signal according to an embodiment of the present invention.

Referring to FIG. 2, the specific steps of the method may include:

210: An access network device determines the number of transmission layers of a UE for transmitting uplink data.

In practice, the access network device may determine the number of transmission layers of the UE for currently transmitting uplink data based on actual needs and the maximum number of transmission layers supportable by the system, where the determined number of transmission layers is less than or equal to the maximum number of transmission layers supportable by the system.

220: The access network device selects, based on the determined number of transmission layers, a combinational configuration of CS and OCC sequence that is used for generating respective DMRS sequences of the transmission layers of the UE for transmitting uplink data, from one of preset multiple combinational configuration items of CS and OCC sequence. The combinational configuration items are set with respect to the maximum number of transmission layers supportable by the system and are usable for generating respective DMRS sequences of the transmission layers.

In an application scenario, the multiple combinational configuration items of CS and OCC sequence used for generating respective DMRS sequences of transmission layers may be preset in the access network and the UE with respect to the maximum number of transmission layers supportable by the system. The preset multiple combinational configuration items may be recorded in a DMRS resource configuration table (or recorded in another form), and each of the combinational configuration items is recorded as an entry of the DMRS resource configuration table.

A first configuration condition is satisfied among the preset combinational configurations.

The first configuration condition is that among the combinational configuration items having at least two same CS resources, different OCC sequences are configured.

Further, each of the preset combinational configuration items may satisfy a second configuration condition or a third configuration condition. The second configuration condition is that, in a combinational configuration item, the spacing between the CS resources corresponding to the transmission layers mapped to a same codeword (e.g., two transmission layers may be mapped to a same codeword) is greater than the spacing between CS resources corresponding to transmission layers mapped to different codewords. The third configuration condition is that, in a combinational configuration item, if the spacing between CS resources corresponding to different transmission layers mapped to a same codeword is less than the spacing between CS resources corresponding to transmission layers mapped to different codewords, then the different transmission layers mapped to a same codeword are configured with different OCC sequence resources.

The access network device may select, based on the determined number of transmission layers and the current status of communication, a combinational configuration of CS and OCC sequence that is used for generating respective DMRS sequences of the transmission layers of the UE for transmitting uplink data, from one of preset multiple combinational configuration items of the CS and OCC sequence. The combinational configuration items are set with respect to the maximum number of transmission layers supportable by the system and are used for generating respective DMRS sequences of the transmission layers. That is, the selected combinational configuration is a configuration subset of one of the preset multiple combinational configuration items.

For example, if the maximum number of transmission layers supportable by the system is 4, and the number of transmission layers of the UE for transmitting uplink data is 2, the access network device may select a combinational configuration of CS and OCC sequence that is used for generating DMRS sequences of 2 transmission layers of the UE for transmitting the uplink data, from one of preset multiple combinational configuration items of CS and OCC sequence, where the combinational configuration items are preset with respect to 4 transmission layers and are used for generating respective DMRS sequences of transmission layers.

In practice, to more flexibly perform resource configuration, the mapping relationship between the number of transmission layers and the selection modes of transmission layer can be preset (e.g., this mapping relationship can be dynamically or semi-statically configured in the UE or the access network device). Based on different selection modes of transmission layer, the combinational configuration of CS and OCC sequences that is selected from one of the preset combinational configuration items may be different. For example, if it is determined that the number of transmission layers of the UE for transmitting uplink data is 2, the access network device may select, based on a certain selection mode of transmission layer, a combinational configuration of CS and OCC sequence corresponding to transmission layers 0 and 1, from one of the preset combinational configuration items, and use the selected combinational configuration as the combinational configuration of the CS and OCC sequence corresponding to transmission layers 0 and 1 of the UE for transmitting uplink data. Alternatively, the access network device may select, based on another selection mode of the transmission layer, a combinational configuration of CS and OCC sequence corresponding to transmission layers 0 and 2 (or transmission layers 0 and 3, or transmission layers 1 and 2, or transmission layers 2 and 3), from one of the preset combinational configuration items, and use the selected combinational configuration as the combinational configuration of the CS and OCC sequence corresponding to transmission layers 0 and 1 of the UE for transmitting uplink data. The rest may be deduced by analogy for other number of the transmission layers.

230: The access network device generates a control signaling and delivers the control signaling to the UE. The control signaling contains configuration indication information, and the configuration indication information indicates the selected combinational configuration of the CS and OCC sequences that is used for generating respective DMRS sequences of the transmission layers of the UE for transmitting uplink data.

In an application scenario, different item numbers may be allocated for the preset multiple combinational configuration items, and different combinational configuration items may be differentiated by the item numbers.

The configuration indication information contained in the control signaling may include: the determined number of transmission layers, and an item number corresponding to the combinational configuration items from which the combinational configuration of CS and OCC sequence resources used for generating respective DMRS sequences of the transmission layers of the UE for transmitting uplink data is selected. The UE can determine, based on the item number and the number of transmission layers, the combinational configuration of CS and OCC sequences from preset multiple combinational configuration items of CS and OCC sequences, where the combinational configuration is selected by the access network device and is used for generating respective DMRS sequences of transmission layers of the UE for transmitting uplink data, and the combinational configuration items are set with respect to the maximum number of transmission layers supportable by the system and are usable for generating respective DMRS sequences of transmission layers. It can be understood that the configuration indication information contained in the control signaling may be other information capable of informing the UE of the indicated corresponding combinational configuration.

In an application scenario, the UE receives the control signaling containing the configuration indication information delivered by the access network device. The configuration indication information is used to indicate the combinational configuration of CS and OCC sequence that is used for generating respective DMRS sequences of transmission layers of the UE for transmitting uplink data. The combinational configuration is selected by the access network device, based on the determined number of transmission layers, from one of preset multiple combinational configuration items of the CS and OCC sequence, and the combinational configuration items are set with respect to the maximum number of transmission layers supportable by the system and are used for generating respective DMRS sequences of transmission layers. The UE determines the combinational configuration of the CS and OCC sequence from the preset multiple combinational configuration items of the CS and OCC sequence according to the configuration indication information, wherein the combinational configuration is selected by the access network device and is used for generating respective DMRS sequences of transmission layers of the UE for transmitting uplink data, and the combinational configuration items are set with respect to the maximum number of transmission layers supportable by the system and are used for generating respective DMRS sequences of transmission layers. Then, the UE generates the respective DMRS sequences of the transmission layers of the UE for transmitting uplink data by using the CS and OCC sequence corresponding to the determined combinational configuration.

Further, the access network device may indicate a DMRS sequence group hopping mode used by the UE, by using the OCC sequence resources in the selected combinational configuration used for generating the DMRS sequences of respective transmission layers of the UE for transmitting uplink data. If the OCC sequence resources in the selected combinational configuration necessary for generating DMRS sequences of respective transmission layers of the UE for transmitting uplink data are the same, the access network device may indicate an inter-subframe DMRS sequence group hopping mode adopted by the UE. If the OCC sequence resources in the selected combinational configuration used for generating DMRS sequences of respective transmission layers of the UE for transmitting uplink data are different, the access network device may indicate an inter-slot DMRS sequence group hopping mode (or an inter-subframe DMRS sequence group hopping mode). In such case, the UE may determine a DMRS sequence group hopping mode based on the determined OCC sequence resources in the selected combinational configurations that are usable for generating respective DMRS sequences of transmission layers for transmitting uplink data.

In addition, the mapping relationship between the item numbers and the DMRS sequence group hopping modes may be preset. The access network device may indicate a DMRS sequence group hopping mode to be used by the UE, by using the item number contained in the configuration indication information, based on a mapping relationship between each of item numbers corresponding to the preset respective combinational configuration items and a DMRS sequence group hopping mode. The DMRS sequence group hopping mode may include an inter-slot DMRS sequence group hopping mode, or an inter-subframe DMRS sequence group hopping mode. In such case, the UE may determine a DMRS sequence group hopping mode based on the item numbers contained in the configuration indication information in the received control signaling.

Further, if the determined number of transmission layers of the UE is greater than 2, the access network device may indicate two HARQ feedback channel resources allocated for the UE, by using the CS resource that are in the selected combinational configuration and correspond to two transmission layers adopting a same available CS resource set.

It can be understood that the technical solution of the present embodiment can be specifically implemented on the access network device. The access network device can be a base station, an evolution base station or other access network device having the wireless backhauling capability.

As can be seen from the above, the present embodiment may preset merely multiple combinational configuration items of CS and OCC sequence with respect to the maximum number of transmission layers supportable by the system, where the combinational configuration items are used for generating respective DMRS sequences of transmission layers; and the combinational configuration of CS and OCC sequence used for generating respective DMRS sequences of transmission layers of the UE for transmitting uplink data is a configuration subset of one of the preset multiple combinational configuration items. This implementation can reduce the complexity of describing in standardization about generating the combinational configuration of the CS and OCC sequence resources usable for generating the DMRS sequences. Setting configuration conditions for the configuration modes of CS and OCC sequence in respective preset combinational configuration items is beneficial to reducing the inter-codeword DMRS interference.

Second Embodiment

In the following, another embodiment of the method for generating a demodulation reference signal is described from the aspect of a user equipment (UE). The method may include the following steps:

Receive control signaling including configuration indication information delivered by an access network device, where the configuration indication information indicates a combinational configuration of CS and OCC sequence resources that is used for generating respective DMRS sequences of transmission layers of the UE for transmitting uplink data, the combination configuration is selected by the access network device, based on a determined number of transmission layers of the UE for transmitting uplink data, from one of preset multiple combinational configuration items of the CS and OCC sequence, and the combinational configuration items are set with respect to the maximum number of transmission layers supportable by the system and are usable for generating respective DMRS sequences of transmission layers. Determine the combinational configuration of the CS and OCC sequence from preset multiple combinational configuration items of the CS and OCC sequence according to the configuration indication information, where the combinational configuration is selected by the access network device and is used for generating respective DMRS sequences of transmission layers of the UE for transmitting uplink data, and the combinational configuration items are set with respect to the maximum number of transmission layers supportable by the system and are usable for generating respective DMRS sequences of transmission layers. Generate the respective DMRS sequences of the transmission layers of the UE for transmitting uplink data by using CS and OCC sequence resources corresponding to the determined combinational configuration.

Further, the UE may determine a DMRS sequence group hopping mode to be adopted, based on the OCC sequence in the determined combinational configuration. If the OCC sequence resource configurations corresponding to the respective transmission layers in the determined combinational configuration are the same, the UE determines an inter-subframe DMRS sequence group hopping mode to be adopted. If the OCC sequence resource configurations corresponding to the respective transmission layers in the determined combinational configuration are different, the UE determines an inter-slot DMRS sequence group hopping mode to be adopted.

In an application scenario, assume that the configuration indication information contained in the received control signaling comprises the number of transmission layers of the UE for transmitting uplink data, and an item number corresponding to the combinational configuration item from which the combinational configuration of CS and OCC sequence resources used for generating respective DMRS sequences of the transmission layers of the UE for transmitting uplink data is selected. In such case, if a mapping relationship established between each of item numbers and a DMRS sequence group hopping mode is preset, then the UE may determine a DMRS sequence group hopping mode, based on the item number comprised in the configuration indication information in the received control signaling.

Further, if the number of transmission layers for transmitting uplink data is greater than 2, then determine the two HARQ feedback channel resources allocated by the access network device, based on a mapping relationship between the HARQ feedback channel resources and the CS resources that are in the selected combinational configuration and corresponding to the two transmission layers adopting a same available CS resource set.

As can be seen from the above, the present embodiment may preset merely multiple combinational configuration items of the CS and OCC sequence with respect to the maximum number of transmission layers supportable by the system, where the combinational configuration items are used for generating respective DMRS sequences of transmission layers; and the combinational configuration of the CS and OCC sequence used for generating respective DMRS sequences of transmission layers of the UE for transmitting uplink data is a configuration subset of one of the preset multiple combinational configuration items. This implementation can reduce the complexity of describing in standardization about generating the combinational configuration of the CS and OCC sequence resources usable for generating DMRS. Setting configuration conditions for the configuration modes of CS and OCC sequence in respective preset combinational configuration items is beneficial to reducing the inter-codeword DMRS interference.

Third Embodiment

To help better understanding of the technical solutions of the embodiments of the present invention, in the following, preset multiple combinational configuration items of CS and OCC resources are described, where the combinational configuration items are set with respect to the maximum number of transmission layers supportable by the system and are usable for generating respective DMRS sequences of transmission layers. In addition, a combinational configuration of CS and OCC sequence resources used for generating respective DMRS sequences of transmission layers of the UE for transmitting uplink data is a configuration subset of one of the preset multiple combinational configuration items.

For example, the maximum number of transmission layers supportable by the system is 4, that is, the maximum rank value is 4, the value range for CS resource is 0 to 11 (see Table 1), and the available OCC sequences are $\{1, 1\}$ and $\{1, -1\}$. Table 2 shows the combinational configuration items that are preset in the access network device and the user equipment with respect to the maximum number of transmission layers supportable by the system, and the combinational configuration items are usable for generating respective DMRS sequences of the transmission layers.

TABLE 2

| DMRS resource configuration number | CS Layer 0, Layer 1, Layer 2, Layer 3 | OCC Layer 0, Layer 1, Layer 2, Layer 3 |
| --- | --- | --- |
| 0 | 0, 6, 3, 9 | $\{1, 1\}, \{1, 1\}, \{1, 1\}, \{1, 1\}$ |
| 1 | 6, 0, 9, 3 | $\{1, 1\}, \{1, 1\}, \{1, -1\}, \{1, -1\}$ |
| 2 | 3, 9, 0, 6 | $\{1, -1\}, \{1, -1\}, \{1, -1\}, \{1, -1\}$ |
| 3 | 4, 10, 1, 7 | $\{1, 1\}, \{1, 1\}, \{1, 1\}, \{1, 1\}$ |
| 4 | 2, 8, 5, 11 | $\{1, 1\}, \{1, 1\}, \{1, 1\}, \{1, 1\}$ |
| 5 | 8, 2, 11, 5 | $\{1, 1\}, \{1, 1\}, \{1, -1\}, \{1, -1\}$ |
| 6 | 10, 4, 7, 1 | $\{1, 1\}, \{1, 1\}, \{1, -1\}, \{1, -1\}$ |
| 7 | 9, 3, 6, 0 | $\{1, -1\}, \{1, -1\}, \{1, 1\}, \{1, 1\}$ |

The following provides descriptions according to four scenarios.

(1)

If the access network device determines that the number of transmission layers of the UE for transmitting uplink data is 1, that is, rank=1, the access network device may select, from Table 2 that is preset, a combinational configuration of CS and OCC sequence that corresponds to any one entry in Table 3 below, as the combinational configuration of the CS and OCC sequence used for generating respective DMRS sequences of transmission layers of the UE for transmitting uplink data.

TABLE 3

| DMRS resource configuration number | CS Transmission layer 0 | OCC Transmission layer 0 |
| --- | --- | --- |
| 0 | 0 | $\{1, 1\}$ |
| 1 | 6 | $\{1, 1\}$ |
| 2 | 3 | $\{1, -1\}$ |
| 3 | 4 | $\{1, 1\}$ |
| 4 | 2 | $\{1, 1\}$ |
| 5 | 8 | $\{1, 1\}$ |
| 6 | 10 | $\{1, 1\}$ |
| 7 | 9 | $\{1, -1\}$ |

In Table 3, the CS resource configuration corresponding to the transmission layer 0 is the same as the DMRS CS resource configuration of single layer transport of LTE Rel-8, which achieves the backward compatibility and can well support the co-existence of the UEs of LTE-Advanced and LTE Rel-8 in the same network.

To support MU-MIMO transmission, it is necessary to allocate different CS resources for the paired UEs. In the CS configurations of Table 3, among the combinational configuration items of CS=2, 3, 4 and CS=8, 9, 10, the spacing between the CS resources is only 1. In the embodiment of the present invention, considering that in an environment of channels having significant time delay, the orthogonality between the respective combinational configuration items with relatively small CS resource spacing (less than a set spacing threshold, for example 1 or 2) cannot be ensured. Therefore, for CS resources with relatively small spacing, different OCC sequence resources are configured to enhance orthogonality. For example, the OCC sequence resource configured corresponding to CS=3 is $\{1, -1\}$, and the OCC sequence corresponding to CS=2 and 4 is $\{1, 1\}$. For example, the OCC sequence resource configured corresponding to CS=9 is $\{1, -1\}$, and the OCC sequence resource corresponding to CS=8 and 10 is $\{1, 1\}$. Because the spacing between other CS configurations is all greater than or equal to 2, orthogonality between respective combinational configuration items is ensured.

Further, if the protection for respective combinational configuration items with CS spacing of 2 is to be enhanced, modification may be made, for example, the OCC sequence resource configured corresponding to CS=0 and CS=6 in Table 3 may be modified as $\{1, -1\}$ for example.

(2)

If the access network device determines that the number of transmission layers of the UE for transmitting uplink data is 2, that is, rank=2, the access network device may select, from Table 2 that is preset, a combinational configuration of CS and OCC sequence corresponding to any one entry in Table 4 below, as the combinational configuration of CS and OCC sequence used for generating respective DMRS sequences of transmission layers of the UE for transmitting uplink data.

TABLE 4

| DMRS resource configuration number | CS Transmission layer 0, Transmission layer 1 | OCC Transmission layer 0, Transmission layer 1 |
|---|---|---|
| 0 | 0, 6 | {1, 1}, {1, 1} |
| 1 | 6, 0 | {1, 1}, {1, 1} |
| 2 | 3, 9 | {1, −1}, {1, −1} |
| 3 | 4, 10 | {1, 1}, {1, 1} |
| 4 | 2, 8 | {1, 1}, {1, 1} |
| 5 | 8, 2 | {1, 1}, {1, 1} |
| 6 | 10, 4 | {1, 1}, {1, 1} |
| 7 | 9, 3 | {1, −1}, {1, −1} |

In Table 4, the CS spacing of the two transmission layers (transmission layers 0 and 1) in any combinational configuration is 6, that is, the maximum spacing within the value range of CS, which can achieve an optimal CS orthogonality.

In practice, considering MU-MIMO scheduling, the paired UEs need to achieve DMRS orthogonality through OCC sequences. Then, for the two transmission layers of the same UE, DMRS orthogonality cannot be achieved by using OCC sequences. For example, transmission layer 0 and transmission layer 1 may use the same OCC sequence.

In Table 4, there also exists a situation where different combinational configuration items contain same CS resources corresponding to different transmission layers. For example, in the combinational configuration items corresponding to item numbers 0 and 1 of Table 4, the configured CS resources are {0, 6} and {6, 0}, respectively. In the combinational configuration items corresponding to item numbers 2 and 7, the configured CS resources are {3, 9} and {9, 3}, respectively. For respective combinational configuration items containing same CS resources, the OCC sequence correspondingly configured therewith may be set to be inter-layer orthogonal.

For example, in the combinational configuration item corresponding to an item number 0, the OCC sequences used by the two transmission layers may be set to be {1, 1} and {1, 1}, respectively, whereas in the combinational configuration item corresponding to an item number 1, the OCC sequences used by the two transmission layers may be set to be {1, 1} and {1, −1}, respectively. In this way, for the two-layer transmission of a single UE, the inter-layer DMRS orthogonality may be better achieved. For the UEs with relatively significant channel time delay, different OCC sequence may be configured for different transmission layers. In addition, to enable the configuration items containing same CS resources to support MU-MIMO transmission, different OCC sequence resources may be used by these configuration items. For example, in the combinational configuration item corresponding to item number 0, the OCC sequences used by the two transmission layers may be set to be {1, 1} and {1, 1}, respectively, and in the combinational configuration item corresponding to an item number 1, the OCC sequences used by the two transmission layers may be set to be {1, 1} and {1, −1}, respectively.

(3)

If the access network device determines the number of transmission layers of the UE for transmitting uplink data is 3, that is, rank=3, the access network device may select, from Table 2 that is preset, a combinational configuration of CS and OCC sequence corresponding to any one entry in Table 5 below, as the combinational configuration of CS and OCC sequence resources used for generating respective DMRS sequences of transmission layers of the UE for transmitting uplink data.

TABLE 5

| DMRS resource configuration number | CS Transmission layer 0, Transmission layer 1, Transmission layer 2 | OCC Transmission layer 0, Transmission layer 1, Transmission layer 2 |
|---|---|---|
| 0 | 0, 6, 3 | {1, 1}, {1, 1}, {1, 1} |
| 1 | 6, 0, 9 | {1, 1}, {1, 1}, {1, −1} |
| 2 | 3, 9, 0 | {1, −1}, {1, −1}, {1, −1} |
| 3 | 4, 10, 1 | {1, 1}, {1, 1}, {1, 1} |
| 4 | 2, 8, 5 | {1, 1}, {1, 1}, {1, 1} |
| 5 | 8, 2, 11 | {1, 1}, {1, 1}, {1, −1} |
| 6 | 10, 4, 7 | {1, 1}, {1, 1}, {1, −1} |
| 7 | 9, 3, 6 | {1, −1}, {1, −1}, {1, 1} |

In Table 5, the CS spacing between transmission layer 0 and transmission layer 1 in each combinational configuration is 6, the same as the CS spacing of rank=2. The CS spacing between transmission layer 2 and transmission layer 0 and the CS spacing between transmission layer 2 and transmission layer 1 are all 3. This spacing is the maximum configurable spacing within the value range of CS and achieves an optimal CS orthogonality. In such case, the CS spacing between any two different transmission layers is different, and OCC sequences different from OCC sequences of other transmission layers may be configured for the transmission layers having relatively small CS spacing with respect to other transmission layers, to enhance the orthogonality of their DMRS sequences. In addition, to support MU-MIMO scheduling with OCC orthogonality, multiple transmission layers of the same UE need to use the same OCC sequences. To meet the demands of MIMO inter-layer DMRS orthogonality of the single UE and inter-MU-MIMO UE DMRS orthogonality, different OCC sequence configuration modes may be used in the configuration items containing the same or partially the same CS resources. For example, if the combinational configuration items corresponding to item number 0 and item number 1 both contain CS resource {0, 6}, then set in the combinational configuration item corresponding to item number 0 that different transmission layers use identical OCC sequences, and set in the combinational configuration item corresponding to item number 1 that the OCC sequence for transmission layer 2 is different from the OCC sequences for other two transmission layers. Similarly, to enable the configuration items containing same CS resources to support MU-MIMO transmission, different OCC resources may be used by these configuration items. For example, in the combinational configuration item corresponding to item number 0, it may be set that the OCC sequences used by the three transmission layers are all {1, 1}, whereas in the combinational configuration item corresponding to item number 2, it may be set that the OCC sequences used by two transmission layers are all {1, −1}.

(4)

If the access network device determines the number of transmission layers of the UE for transmitting uplink data is 4, that is, rank=4, the access network device may select, from Table 2 that is preset, a combinational configuration of CS and OCC sequence corresponding to any one entry, as the combinational configuration of CS and OCC sequence used for generating respective DMRS sequences of transmission layers of the UE for transmitting uplink data.

The CS and OCC resource configurations corresponding to transmission layers 0 to 2 are the same as the configurations of rank=3.

According to the mapping relationships between the LTE-Advanced transmission layers and codewords, the transmission layers 0 and 1 are mapped to codeword 0, and the transmission layers 2 and 3 are mapped to codeword 1.

It can be seen that, in Table 2, the CS spacing between the two transmission layers mapped to the same codeword under each combinational configuration is 6. This arrangement enables the CS spacing between the transmission layers to still be the maximum when a single codeword is re-transmitted non-adaptively. Therefore, the orthogonality of the retransmitted DMRS resources is ensured.

Further, in Table 2, the CS spacing between the transmission layers mapped to different codewords is 3, which is less than the CS spacing between the two transmission layers mapped to the same codeword (that is, the second configuration condition is satisfied). Therefore, OCC sequences may be used to enhance orthogonality.

To support MU-MIMO scheduling with OCC sequence orthogonality, the configurations where different transmission layers use same OCC sequences are also required. Therefore, different OCC sequence resource configuration modes may be used in respective combinational configuration items containing at least two same CS resource configurations (containing completely or partially same CS resource configurations). For example, in Table 2, the combinational configuration items corresponding to item numbers 0 and 1 all contain CS resource {0, 3, 6, 9}, then, in the combinational configuration item corresponding to item number 0, different transmission layers use same OCC sequence resources, and in the combinational configuration item corresponding to item number 1, the OCC sequence configured for transmission layers 2 and 3 are different from the OCC sequence configured for transmission layers 0 and 1.

The access network device may generate control signaling and deliver the control signaling to the UE. The control signaling may contain configuration indication information which is used to indicate the selected combinational configuration of CS and OCC sequence resources used for generating respective DMRS sequences of transmission layers of the UE for transmitting uplink data.

The configuration indication information may comprise the determined number of transmission layers, and the item number corresponding to the combinational configuration item (any one of 0-7) from which the combinational configuration of CS and OCC sequence resources used for generating respective DMRS sequences of the transmission layers of the UE for transmitting uplink data is selected.

The UE receives the control signaling that contains the configuration indication information and is delivered by the access network device; determines the combinational configuration of CS and OCC sequences from preset multiple combinational configuration items of CS and OCC sequence according to the configuration indication information (number of transmission layers and an item number corresponding to a selected combinational configuration item), wherein the combinational configuration is selected by the access network device and is used for generating respective DMRS sequences of transmission layers of the UE for transmitting uplink data, and the combinational configuration items are set with respect to the maximum number of transmission layers supportable by the system and are used for generating respective DMRS sequences of transmission layers; generates the respective DMRS sequences of the transmission layers of the UE for transmitting uplink data by using CS and OCC sequences corresponding to the combinational configuration determined by the configuration determination unit.

Fourth Embodiment

In this embodiment, multiple combinational configuration items of CS and OCC resources usable for generating the respective DMRS sequences of transmission layers are preset with respect to the maximum number of transmission layers supportable by the system.

In respective combinational configuration items, different OCC sequence resources are configured among combinational configuration items with relatively small CS spacing, to enhance orthogonality of DMRS.

For example, as shown in Table 6 below, with respect to Table 2, when rank=1, different OCC sequences are used for respective combinational configuration items with CS spacing being less than 3. The CS and OCC resource configuration modes corresponding to other rank values are similar to those of the third embodiment.

TABLE 6

| DMRS resource configuration number | CS<br>Layer 0, Layer 1,<br>Layer 2, Layer 3 | OCC<br>Layer 0, Layer 1,<br>Layer 2, Layer 3 |
| --- | --- | --- |
| 0 | 0, 6, 3, 9 | {1, −1}, {1, −1}, {1, −1}, {1, −1} |
| 1 | 6, 0, 9, 3 | {1, −1}, {1, −1}, {1, 1}, {1, 1} |
| 2 | 3, 9, 0, 6 | {1, −1}, {1, −1}, {1, −1}, {1, −1} |
| 3 | 4, 10, 1, 7 | {1, 1}, {1, 1}, {1, 1}, {1, 1} |
| 4 | 2, 8, 5, 11 | {1, 1}, {1, 1}, {1, 1}, {1, 1} |
| 5 | 8, 2, 11, 5 | {1, 1}, {1, 1}, {1, −1}, {1, −1} |
| 6 | 10, 4, 7, 1 | {1, 1}, {1, 1}, {1, −1}, {1, −1} |
| 7 | 9, 3, 6, 0 | {1, −1}, {1, −1}, {1, 1}, {1, 1} |

The processing modes of the access network device and the UE of the present embodiment may be learned by referring to relevant description in the third embodiment and therefore are not described herein.

Fifth Embodiment

In this embodiment, multiple combinational configuration items of CS and OCC resources used for generating the respective DMRS sequences of transmission layers are preset with respect to the maximum number of transmission layers supportable by the system.

The preset respective combinational configuration items satisfy that, different OCC sequences are configured among the combinational configuration items containing at least two same CS resources (the first configuration condition). This mode may be used for optimizing inter-layer DMRS orthogonality of a single UE, and achieving OCC orthogonality of DMRS between the MU-MIMO UEs.

For example, as shown in Table 7 below, when rank=2, the combinational configuration items containing identical CS resources use different OCC sequence resource configuration modes.

TABLE 7

| DMRS resource configuration number | CS<br>Layer 0, Layer 1,<br>Layer 2, Layer 3 | OCC<br>Layer 0, Layer 1,<br>Layer 2, Layer 3 |
| --- | --- | --- |
| 0 | 0, 6, 3, 9 | {1, 1}, {1, 1}, {1, 1}, {1, 1} |
| 1 | 6, 0, 9, 3 | {1, 1}, {1, −1}, {1, 1}, {1, −1} |
| 2 | 3, 9, 0, 6 | {1, −1}, {1, −1}, {1, −1}, {1, −1} |
| 3 | 4, 10, 1, 7 | {1, 1}, {1, 1}, {1, 1}, {1, 1} |
| 4 | 2, 8, 5, 11 | {1, 1}, {1, 1}, {1, 1}, {1, 1} |
| 5 | 8, 2, 11, 5 | {1, 1}, {1, −1}, {1, 1}, {1, −1} |
| 6 | 10, 4, 7, 1 | {1, 1}, {1, −1}, {1, 1}, {1, −1} |
| 7 | 9, 3, 6, 0 | {1, −1}, {1, 1}, {1, −1}, {1, 1} |

As shown in Table 7, to achieve that the combinational configurations for the small rank values are a configuration subset of the combinational configurations for the large rank values, in a preset combinational configuration item, same or different OCC sequences may be set for the transmission layers with the same CS resources, such as the configuration items corresponding to numbers 1, 5, 6, 7.

The processing modes of the access network device and the UE of the present embodiment may be learned by referring to relevant description in the third embodiment and therefore are not described herein.

Sixth Embodiment

In this embodiment, to more flexibly achieve resource configuration, a mapping relationship between the numbers of transmission layers and the selection modes of the transmission layer may be preset (that is, the same or different selection modes of the transmission layer corresponding to different rank values are predefined respectively). This can achieve that under different rank values, the same transmission layer numbers may use same or different CS and OCC resource configurations.

Under different rank values, same transmission layer numbers correspond to the scenario of using same CS and OCC resource configurations, that is, perform the selection from small transmission layer number to large transmission layer number.

For example, in the combinational configuration item where rank=4 is preset, the combinational configuration of CS and OCC sequence resources of its transmission layer 0 is also the CS and OCC configuration used by transmission layer 0 selected under rank=1, rank=2, and rank=3, the configuration of its transmission layer 1 is also the CS and OCC resource configuration used by transmission layer 1 selected under rank=2 and rank=3.

Wherein, under different rank values, identical transmission layer numbers correspond to the scenario of using different CS and OCC resource configurations, i.e., do not perform the selection from small transmission layer number to large transmission layer number.

For example, the combinational configuration of CS and OCC sequence for rank=1 may be defined as the CS and OCC resource configuration used by transmission layer 0, or transmission layer 1, or other transmission layers in the preset combinational configuration items.

The CS and OCC sequence resource configuration for rank=2 is defined as the CS and OCC resource configuration used by transmission layers 0 and 1, 2 or 3, or transmission layers 1 and 2, or a combination of other two different transmission layers in the preset combinational configuration items.

The CS and OCC sequence resource configuration for rank=3 is defined as the CS and OCC resource configuration used by transmission layers 0, 1, 2 or transmission layers 2, 3, 4 or transmission layers 1, 3, 4 or a combination of other three different transmission layers in the preset resource configurations.

The system may simultaneously support multiple mapping relationships between the number of transmission layers and the selection modes of transmission layer. The access network device may inform the UE or the network of the currently used mapping relationship between the number of transmission layers and the selection modes of transmission layer, in a dynamic or semi-static configuration mode.

Seventh Embodiment

In this embodiment, the access network device indicates to the UE the DMRS sequence group hopping modes.

In an application scenario, when OCC orthogonality is used, an inter-slot DMRS sequence group hopping mode is not used. In such case, an inter-subframe DMRS sequence group hopping mode may be used to keep inter-cell DMRS interferences randomized. The access network device may allocate inter-slot sequence group hopping and inter-subframe sequence group hopping or different UEs, respectively, and notify the UEs through control signaling.

The configuration of DMRS sequence group hopping mode may also be configured, together with CS and OCC resources, as a part of the DMRS resource configuration of the access network device.

The access network device may indicate a DMRS sequence group hopping mode to be adopted by the UE, by using the OCC sequence resources in the selected combinational configuration used for generating the DMRS sequences of respective transmission layers of the UE for transmitting uplink data.

For example, as shown in Table 8 below, if the OCC sequence resource in the selected combinational configuration used for generating the respective DMRS sequences of transmission layers of the UE for transmitting uplink data, selected by the access network device, are the same (or the combinational configuration with same OCC sequence used by all transmission layers), then indicate the UE to adopt the inter-subframe DMRS sequence group hopping mode.

If the OCC sequence resource configurations used for generating the respective DMRS sequences of transmission layers of the UE for transmitting uplink data, as selected by the access network device, are different (or the combinational configuration with different OCC sequences used by all transmission layers), then indicate the UE to adopt the inter-slot DMRS sequence group hopping mode or the inter-subframe DMRS sequence group hopping mode.

In such case, after determining the OCC sequence resource configuration used for generating respective the DMRS sequences of its transmission layers for transmitting uplink data, the UE may determine the DMRS sequence group hopping mode based on the determined OCC configuration.

For example, as shown in Table 8, DMRS combinational configuration items with item numbers 0, 2, 3, 4 may be configured as the inter-subframe hopping, and other combinational configuration items may be configured as the inter-slot hopping (or the inter-subframe hopping).

TABLE 8

| DMRS resource configuration number | CS<br>Layer 0, Layer 1,<br>Layer 2, Layer 3 | OCC<br>Layer 0, Layer 1,<br>Layer 2, Layer 3 | Sequence group hopping mode |
|---|---|---|---|
| 0 | 0, 6, 3, 9 | {1, 1}, {1, 1}, {1, 1}, {1, 1} | Inter-subframe hopping |
| 1 | 6, 0, 9, 3 | {1, 1}, {1, 1}, {1, −1}, {1, −1} | Inter-slot hopping |

TABLE 8-continued

| DMRS resource configuration number | CS Layer 0, Layer 1, Layer 2, Layer 3 | OCC Layer 0, Layer 1, Layer 2, Layer 3 | Sequence group hopping mode |
|---|---|---|---|
| 2 | 3, 9, 0, 6 | {1, −1}, {1, −1}, {1, −1}, {1, −1} | Inter-subframe hopping |
| 3 | 4, 10, 1, 7 | {1, 1}, {1, 1}, {1, 1}, {1, 1} | Inter-subframe hopping |
| 4 | 2, 8, 5, 11 | {1, 1}, {1, 1}, {1, 1}, {1, 1} | Inter-subframe hopping |
| 5 | 8, 2, 11, 5 | {1, 1}, {1, 1}, {1, −1}, {1, −1} | Inter-slot hopping |
| 6 | 10, 4, 7, 1 | {1, 1}, {1, 1}, {1, −1}, {1, −1} | Inter-slot hopping |
| 7 | 9, 3, 6, 0 | {1, −1}, {1, −1}, {1, 1}, {1, 1} | Inter-slot hopping |

In addition, in actual systems the maximum number of transmission layers of MU-MIMO paired UEs are subject to a limit (e.g., at most a transmission of rank=2 can be performed). Therefore, sequence group hopping modes may be set in accordance with the OCC configurations of part of transmission layers in DMRS resource configurations. For example, DMRS sequence group hopping modes may be set merely in accordance with the OCC configurations of transmission layer 0 and transmission layer 1. If the OCC sequences of the two transmission layers are identical, then the inter-slot hopping or the inter-subframe hopping may be configured. If the OCC sequences of the two transmission layers are different, then the inter-slot hopping may be configured. In the meantime, the combinational configuration items of the DMRS resources, which are configured with the inter-subframe hopping, should include configurations using different OCC sequences. As shown in Table 8, DMRS configurations with configuration numbers 0, 1, 4, 5 are configured with the inter-subframe hopping, wherein the OCC used by configurations 0 and 1 is {1, −1}, the OCC used by configurations 4 and 5 is {1, 1}. For other specific CS and OCC configuration tables, the same principles may be followed to add sequence group hopping mode configurations.

In another application scenario, mapping relationship between a DMRS sequence group hopping mode and each of item numbers of preset respective combinational configuration items may be preset. That is, under the same combinational configuration item, different rank values use identical sequence group hopping modes. Also, these hopping modes may be adaptively changed based on the OCC resource configurations under respective rank values. In Table 9 below, when rank=1, 3 or 4, the sequence group hopping mode configurations as listed are used. When rank=2, because different transmission layers in all resource configuration options use identical OCC sequences, all configuration options may use inter-subframe sequence group hopping. Because the hopping mode configurations are decided by the OCC configurations, adaptive changes in the sequence group hopping modes under different rank values will not incur additional signaling overhead.

TABLE 9

| DMRS resource configuration number | CS Layer 0, Layer 1, Layer 2, Layer 3 | OCC Layer 0, Layer 1, Layer 2, Layer 3 | Sequence group hopping mode |
|---|---|---|---|
| 0 | 0, 6, 3, 9 | {1, −1}, {1, −1}, {1, −1}, {1, −1} | Inter-subframe hopping |
| 1 | 6, 0, 9, 3 | {1, −1}, {1, −1}, {1, 1}, {1, 1} | Inter-subframe hopping |
| 2 | 3, 9, 0, 6 | {1, −1}, {1, −1}, {1, −1}, {1, −1} | Inter-slot hopping |
| 3 | 4, 10, 1, 7 | {1, 1}, {1, 1}, {1, 1}, {1, 1} | Inter-slot hopping |
| 4 | 2, 8, 5, 11 | {1, 1}, {1, 1}, {1, 1}, {1, 1} | Inter-subframe hopping |
| 5 | 8, 2, 11, 5 | {1, 1}, {1, 1}, {1, −1}, {1, −1} | Inter-subframe hopping |
| 6 | 10, 4, 7, 1 | {1, 1}, {1, 1}, {1, −1}, {1, −1} | Inter-slot hopping |
| 7 | 9, 3, 6, 0 | {1, −1}, {1, −1}, {1, 1}, {1, 1} | Inter-slot hopping |

As can be seen from above, in the present embodiment, the access network device may configure the inter-OCC sequence group hopping modes of the UE without adding additional signaling.

Eighth Embodiment

In this embodiment, the access network device indicates to the UE the resource locations of HARQ feedback channels.

When adopting UL MIMO transmission in an LTE-A system, it is necessary to allocate two HARQ feedback channels for one UE, each of the two HARQ feedback channels corresponding to a data transmission block.

Mapping relationships between CS resource configurations and CS resource numbers may be defined. The resource locations of HARQ feedback channels may be indicated to the UE by using CS resources that are in the selected combinational configuration and correspond to two transmission layers adopting a same available CS resource set.

For example, in respective configuration tables of above embodiments, the available CS resource set of transmission layers 0 and 1 is {0, 2, 3, 4, 6, 8, 9, 10}, and the item numbers of the combinational configuration items mapped by the CS resources are different. A mapping relationship between CS resource configuration and CS resource number may be defined (e.g., as shown in Table 10).

TABLE 10

| CS resouce number (allocation of HARQ feedback channels for the UEs) | CS |
|---|---|
| 0 | 0 |
| 1 | 6 |
| 2 | 3 |
| 3 | 4 |
| 4 | 2 |
| 5 | 8 |
| 6 | 10 |
| 7 | 9 |

The access network device may indicate the two HARQ feedback channel resources allocated for the UE, using the CS resources that are in the selected combinational configurations and correspond to two transmission layers adopting a same available CS resource set. The UE may generate the CS resource numbers corresponding to the CS resource configurations of transmission layers 0 and 1 (as shown in Table 11), respectively, based on the defined mapping relationship, apply the CS resource numbers to current HARQ feedback channel allocation equation, respectively, and the allocated HARQ feedback channel resources may be determined.

For example, when the access network device informs the UE to use the combinational configuration item with an item number 0, transmission layer 0 uses CS=0 and transmission layer 1 uses CS=6 in its corresponding CS resource configuration. The UE may determine that the CS resource numbers corresponding to the CS resource configuration of the two transmission layers are 0 and 1 (as shown in Table 11), based on the mapping relationship between CS resource configurations and CS resource numbers defined in Table 10. The UE may apply the CS resource numbers to current HARQ feedback channel allocation equation, respectively, and determine the HARQ feedback channel resources as allocated by the access network device.

TABLE 11

| DMRS resource configuration number | CS Transmission layer 0, Transmission layer 1 | CS resource number |
|---|---|---|
| 0 | 0, 6 | (0, 1) |
| 1 | 6, 0 | (1, 0) |
| 2 | 3, 9 | (2, 7) |
| 3 | 4, 10 | (3, 6) |
| 4 | 2, 8 | (4, 5) |
| 5 | 8, 2 | (5, 4) |
| 6 | 10, 4 | (6, 3) |
| 7 | 9, 3 | (7, 2) |

It can be understood that, if the CS resource configured for transmission layer 0 is identical with the CS resource in the LTE system, and the defined mapping relationship between the CS resource configurations and the CS resource numbers is identical with what is defined in the LTE system, then MU-MIMO scheduling can be well achieved for LTE and LTE-Advanced, and conflicts will not occur between the allocated HARQ feedback channels.

As can be seen from above, in the present embodiment, the access network device may indicate to the UE two layers of HARQ feedback channels using CS resource configurations, without adding additional signaling.

In the above disclosure, respective embodiments are described with respective focuses, and a part not described in detail in a certain embodiment may be found in relevant description of other embodiments.

In summary, the solutions of the embodiments of the present invention may preset merely multiple combinational configuration items of CS and OCC sequence resources with respect to the maximum number of transmission layers supportable by the system, where the combinational configuration items are usable for generating respective DMRS sequences of transmission layers; and the combinational configuration of CS and OCC sequence used for generating respective DMRS sequences of transmission layers of the UE for transmitting uplink data is a configuration subset of one of the preset multiple combinational configuration items. This implementation mode can simplify the complexity of describing in standardization about generating the combinational configuration of CS and OCC sequence usable for generating DMRS, and is easy for both standardization and systematic implementation.

In the meantime, setting respective configuration conditions for CS and OCC sequence resource configuration modes in respective combinational configuration items is helpful for reducing inter-codeword DMRS interferences. This optimizes the DMRS orthogonality between different transmission layers in a single UE MIMO transmission, while at the same time supports the DMRS of a UE in a MU-MIMO transmission to use the OCC orthogonality.

Further, the access network device may configure CS sequence group hopping modes of the UE, without adding additional signaling.

Further, the access network device may indicate to the UE two layers of HARQ feedback channels using CS resource configurations, without adding additional signaling.

To better implement the technical solutions of the above embodiments of the present invention, the embodiments of the present invention further provide devices corresponding to the technical solutions of the above embodiments of the present invention.

Figure 3:
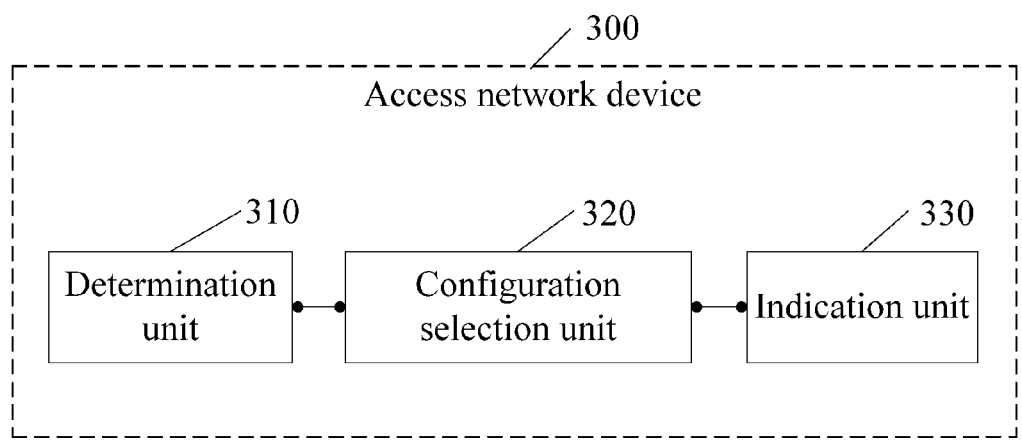
FIG. 3 is a simplified block diagram of an access network device according to an embodiment of the present invention.

Referring now to FIG. 3, an access network device 300 provided by the embodiments of the present invention includes:

a determination unit 310, configured to determine the number of transmission layers of a UE for transmitting uplink data;

a configuration selection unit 320, for selecting, based on the number of transmission layers as determined by the determination unit 310, combinational configurations of cyclic shift CS and orthogonal cover code OCC sequence necessary for generating DMRS sequences of respective transmission layers of the UE for transmitting uplink data, from one combinational configuration item of multiple combinational configuration items of CS and OCC sequence that are preset, directed to the maximum number of transmission layers supportable by the system, and usable for generating demodulation reference signal DMRS sequences of respective transmission layers; wherein, a first configuration condition is satisfied among the preset respective combinational configuration items, the first configuration condition is that respective combinational configuration items containing at least two identical CS resource configurations use different OCC sequence resource configurations;

an indication unit 330, for generating and delivering to the UE a control signaling containing configuration indication information, which information is used to indicate the combinational configurations of CS and OCC sequence necessary for generating DMRS sequences of respective transmission layers of the UE for transmitting uplink data, as selected by the configuration selection unit 320.

In an application scenario, the preset respective combinational configuration items also satisfy a second configuration condition or a third configuration condition.

Wherein, the second configuration condition is that, in a combinational configuration, the spacing between CS resources corresponding to different transmission layers mapped to the same codeword is greater than the spacing between CS resources corresponding to the transmission layers mapped to different codewords.

The third configuration condition is that, in a combinational configuration item, if the spacing between CS resources corresponding to different transmission layers mapped to the same codeword is less than the spacing between CS resources corresponding to the transmission layers mapped to different codewords, then the different transmission layers mapped to the same codeword are configured with different OCC sequence.

In an application scenario, the indication unit 330 further can be used to indicate DMRS sequence group hopping modes adopted by the UE, by using the selected OCC sequence resource configurations necessary for generating DMRS sequences of respective transmission layers of the UE for transmitting uplink data. Wherein, if the selected OCC sequence resource configurations necessary for generating DMRS sequences of respective transmission layers of the UE for transmitting uplink data are identical, indicate the UE to use the inter-subframe DMRS sequence group hopping mode. If the selected OCC sequence resource configurations necessary for generating DMRS sequences of respective transmission layers of the UE for transmitting uplink data are different, indicate the UE to use the inter-slot DMRS sequence group hopping mode.

In an application scenario, the configuration indication information includes the determined number of transmission layers, and the item number corresponding to the selected combinational configuration item from the preset multiple combinational configuration items.

The indication unit 330 further can be used to indicate, based on mapping relationships between item numbers corresponding to the preset respective combinational configuration items and DMRS sequence group hopping modes, the DMRS sequence group hopping modes to be adopted by the UE, using the item numbers included in the configuration indication information.

In an application scenario, the configuration selection unit 320 may be specifically used to select, according to the determined number of transmission layers, and based on a preset mapping relationship between the number of transmission layers and selection modes of a transmission layer, combinational configurations of CS and OCC sequence necessary for generating DMRS sequences of respective transmission layers of the UE for transmitting uplink data, from one combinational configuration item of multiple combinational configuration items of CS and OCC sequence that are preset, directed to the maximum number of transmission layers supportable by the system, and usable for generating demodulation reference signal DMRS sequences of respective transmission layers.

In an application scenario, the indication unit 330 further can be used to indicate two hybrid automatic repeat request HARQ feedback channel resources allocated for the UE, using CS resource configurations corresponding to the two selected transmission layers adopting identical available CS resource collections, when the number of transmission layers as determined by the determination unit 310 is greater than 2.

It can be understood that the access network device 500 of the present embodiment may be similar to the access network devices of the above method embodiments, and the functions of its respective functional units may be specifically implemented according to the methods in above method embodiments, which are hence omitted herein.

Figure 4:
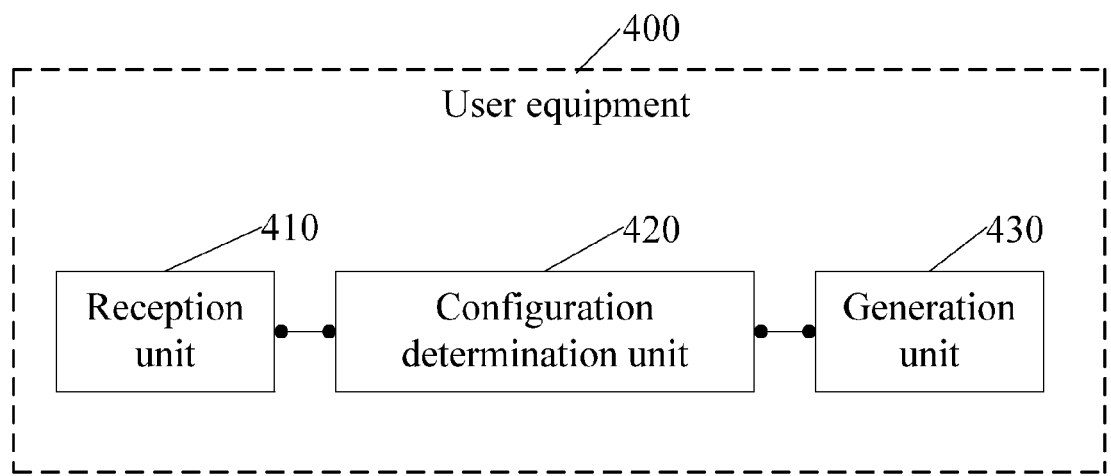
FIG. 4 is a simplified block diagram of a user equipment according to an embodiment of the present invention.

Referring now to FIG. 4, a user equipment 400 provided by the embodiments of the present invention, includes:

a reception unit 410, configured to receive a control signaling containing configuration indication information delivered by an access network device, the configuration indication information to indicate, combinational configurations of CS and OCC sequence necessary for generating DMRS sequences of respective transmission layers of the UE for transmitting uplink data, which are selected by the access network device, based on the determined number of transmission layers of the user equipment for transmitting uplink data, from one combinational configuration item of multiple combinational configuration items of CS and OCC sequence that are preset, directed to the maximum number of transmission layers supportable by the system, and usable for generating demodulation reference signal DMRS sequences of respective transmission layers;

a configuration determination unit 420, configured to determine, based on the configuration indication information contained in the control signaling received by the reception unit 410, combinational configurations of CS and OCC sequence necessary for generating DMRS sequences of respective transmission layers of the UE for transmitting uplink data, as selected by the access network device, from one combinational configuration item of multiple combinational configuration items of CS and OCC sequence that are preset, directed to the maximum number of transmission layers supportable by the system, and usable for generating demodulation reference signal DMRS sequences of respective transmission layers; a generation unit 430, configured to generate the DMRS sequences of respective transmission layers of the UE for transmitting uplink data, and use the CS and OCC sequence corresponding to the combinational configurations as determined by the configuration determination unit 420.

In an application scenario, the configuration determination unit 420 further can be used to determine the DMRS sequence group hopping modes to be used, based on the OCC sequence corresponding to the respective transmission layers in the determined combinational configuration. Wherein, if the OCC sequence resource configurations corresponding to respective transmission layers in the determined combinational configuration are identical, then the inter-subframe DMRS sequence group hopping mode is determined for use. If the OCC sequence resource configurations corresponding to respective transmission layers in the determined combinational configuration are different, then the inter-slot DMRS sequence group hopping mode is determined for use.

In an application scenario, the configuration determination unit 420 further can be used to obtain the two HARQ feedback channel resources as allocated by the access network device, based on the mapping relationships between the preset HARQ feedback channel resources and the CS resources corresponding to the two transmission layers adopting identical available CS resource collections in the determined combinational configuration.

It can be understood that the user equipment 400 of the present embodiment may be similar to the UEs of the above method embodiments, and the functions of its respective functional units may be specifically implemented according to the methods in above method embodiments, which are hence omitted herein.

A person of ordinary skill in the art can appreciate that, all or part of the steps in respective methods of the above embodiments may be implemented by a program instructing relevant hardware. The program may be stored in a computer readable storage medium. The storage medium may include ROM, RAM, magnetic disk or optical disk, etc.

In the above, a resource configuration method and a device for a demodulation reference signal as provided by the embodiments of the present invention are described in detail. Specific examples are used to expound the principles and the implementations of the present invention. The descriptions of the above embodiments are merely intended to help understanding the method and gist of the present invention. In the meantime, a person of ordinary skills in the art may modify the specific embodiments and application scope of the present invention, in accordance with the spirit of the present invention. All in all, the contents of this description should not be construed as a limitation to the present invention.

The invention claimed is:

1. A method for generating demodulation reference signal (DMRS) sequences in a communication system, comprising:
   determining, by an access network device, quantity of transmission layers of a user equipment (UE) for transmitting uplink data;
   selecting, by the access network device, a combination item among a plurality of predetermined combination items, wherein the combination item comprises N combinations of a Cyclic Shift (CS) resource and an Orthogonal Cover Code (OCC) sequence, the N combinations correspond to N transmission layers supported by the communication system, wherein N is an integer larger than or equal to the quantity of transmission layers of the UE for transmitting uplink data; and one combination is used for generating a DMRS sequence for each transmission layer of the UE;
   generating, by the access network device, a control signaling containing the determined quantity of the transmission layers of the UE for transmitting uplink data, and an item number corresponding to the selected combination item;
   sending, by the access network device, the control signaling to the UE; and
   receiving, by the access network device, the DMRS sequences generated by the UE according to the control signaling,
   wherein the DMRS sequences are such that spacing between the CS resources for generating the DMRS sequences corresponding to transmission layers mapped to a same codeword is larger than spacing between the CS resources for generating the DMRS sequences corresponding to transmission layers mapped to different codewords.

2. The method according to claim 1, wherein the predetermined combination items satisfy a first configuration condition; and
   the first configuration condition is that the OCC sequences in the at least two of the predetermined combination items having the same CS resources are different.

3. The method according to claim 1, wherein each of the predetermined combinations items satisfies a second configuration condition; and
   the second configuration condition is that, in one of the predetermined combination items, the spacing between CS resources corresponding to the transmission layers mapped to the same codeword is greater than the spacing between CS resources corresponding to the transmission layers mapped to different codewords;
   wherein N is equal to 4, the 4 transmission layers supported by the communication system are transmission layer 0, transmission layer 1, transmission layer 2, and transmission layer 3, the transmission layer 0 and transmission layer 1 are mapped to a first codeword, and the transmission layer 2 and transmission layer 3 are mapped to a second codeword.

4. The method according to claim 1, wherein each of the preset combinations items satisfies a third configuration condition; and
   the third configuration condition is that, in one of the predetermined combination items, if the spacing between CS resources corresponding to different transmission layers mapped to the same codeword is less than the spacing between CS resources corresponding to the transmission layers mapped to different codewords, then the different transmission layers mapped to the same codeword are configured with different OCC sequence.

5. The method according to claim 1, wherein the method further comprises:
   indicating a DMRS sequence group hopping mode for the UE, by using the item number comprised in the indication of the selected combination(s) of the CS resource and OCC sequence based on a mapping relationship between each of the item numbers and the DMRS sequence group hopping mode.

6. The method according to claim 1, further comprising:
   indicating a DMRS sequence group hopping mode adopted by the UE, by using the OCC sequences in the selected combinations;
   wherein if the OCC sequences in the selected combinations are same, it is indicating the UE to adopt the inter-subframe DMRS sequence group hopping mode, if the OCC sequence in the selected combinations are different, it is indicating the UE to adopt the inter-slot DMRS sequence group hopping mode.

7. The method according to claim 1, further comprising:
   if the determined quantity of transmission layers is greater than 2, indicating two Hybrid Automatic Repeat Request (HARQ) feedback channel resources allocated for the UE, by using CS resources corresponding to two transmission layers adopting a same available CS resource set.

8. A method for generating demodulation reference signal (DMRS) sequences in a communication system, comprising:
   receiving, by a user equipment (UE), a control signaling from an access network device, wherein the control signaling comprises quantity of the transmission layers of the UE for transmitting uplink data, and an item number, wherein the item number corresponds to an combination item among a plurality of predetermined combination items, wherein the combination item comprises N combinations of a Cyclic Shift (CS) resource and an Orthogonal Cover Code (OCC) sequence, the N combinations correspond to N transmission layers supported by the communication system, wherein N is an integer larger than or equal to the quantity of transmission layers of the UE for transmitting uplink data; and wherein one combination is used for generating a DMRS sequence for each transmission layer of the UE;

determining, by the UE, a combination of a CS resource and an OCC sequence for each of the transmission layers of the UE for transmitting uplink data according to the control signaling; and generating, by the UE, a DMRS, sequence for each of the transmission layers of the UE by using the selected combination of the CS resource and the OCC sequence corresponding to the transmission layer; and sending, by the UE, the DMRS sequences to the access network device, wherein the DMRS sequences are such that spacing between the CS resources for generating the DMRS sequences corresponding to transmission layers mapped to a same codeword is larger than spacing between the CS resources for generating the DMRS sequences corresponding to transmission layers mapped to different codewords.

9. The method according to claim 8, wherein the predetermined combination items satisfy a first configuration condition; and the first configuration condition is that the OCC sequences in the at least two of the predetermined combination items having the same CS resources are different.

10. The method according to claim 8, wherein each of the predetermined combinations items satisfies a second configuration condition; and the second configuration condition is that, in one of the predetermined combination items, the spacing between CS resources corresponding to the transmission layers mapped to the same codeword is greater than the spacing between CS resources corresponding to the transmission layers mapped to different codewords;

wherein N is equal to 4, the 4 transmission layers supported by the communication system are transmission layer 0, transmission layer 1, transmission layer 2, and transmission layer 3, the transmission layer 0 and transmission layer 1 are mapped to a first codeword, and the transmission layer 2 and transmission layer 3 are mapped to a second codeword.

11. The method according to claim 8, wherein each of the preset combinations also satisfies a third configuration condition; and the third configuration condition is that, in one of the predetermined combination items, if the spacing between CS resources corresponding to different transmission layers mapped to the same codeword is less than the spacing between CS resources corresponding to the transmission layers mapped to different codewords, then the different transmission layers mapped to the same codeword are configured with different OCC sequence.

12. The method according to claim 8, further comprising:
determining a DMRS sequence group hopping mode to be adopted, based on the item number included in the indication and a mapping relationship between each of the item numbers and the DMRS sequence group hopping mode.

13. The method according to claim 8, further comprising:
determining a DMRS sequence group hopping mode to be adopted, based on OCC sequences in the determined combinations;

wherein, if the OCC sequences corresponding to the respective transmission layers in the determined combinations are the same, determining an inter-subframe DMRS sequence group hopping mode to be adopted; if the OCC sequences corresponding to the respective transmission layers in the determined combinations are different, determining an inter-slot DMRS sequence group hopping mode to be adopted.

14. The method according to claim 8, further comprising:
if the quantity of transmission layers of the UE for transmitting uplink data is greater than 2, determining two HARQ feedback channel resources allocated by the access network device, based on a preset mapping relationship between HARQ feedback channel resources and CS resources that are in the determined combinations and correspond to two transmission layers adopting a same available CS resource set.

15. An access network device, comprising a processor and a memory storing a program product for use by the processor, wherein the program product comprises the following functional units:

a determination unit, configured to determine quantity of transmission layers of a user equipment (UE) for transmitting uplink data;

a configuration selection unit, configured to select, a combination item among a plurality of predetermined combination items, wherein the combination item comprises N combinations of a Cyclic Shift (CS) resource and an Orthogonal Cover Code (OCC) sequence, the N combinations correspond to N transmission layers supported by the communication system, wherein N is an integer larger than or equal to the quantity of transmission layers of the UE for transmitting uplink data; and one combination is used for generating a DMRS sequence for each transmission layer of the UE;

an indication unit, configured to generate a control signaling containing the determined quantity of the transmission layers of the UE for transmitting uplink data, and an item number corresponding to the selected combination item, and cause the control signaling to be sent to the UE; and a receiver, configured to receive the DMRS sequences generated by the UE according to the control signaling, wherein the DMRS sequences are such that spacing between the CS resources for generating the DMRS sequences corresponding to transmission layers mapped to a same codeword is larger than spacing between the CS resources for generating the DMRS sequences corresponding to transmission layers mapped to different codewords.

16. The access network device according to claim 15, wherein the predetermined combination items satisfy a first configuration condition; and the first configuration condition is that the OCC sequences in the at least two of the predetermined combination items having the same CS resources are different.

17. The access network device according to claim 15, wherein each of the predetermined combinations items satisfies a second configuration condition; and the second configuration condition is that, in one of the predetermined combination items, the spacing between CS resources corresponding to the transmission layers mapped to the same codeword is greater than the spacing between CS resources corresponding to the transmission layers mapped to different codewords;

wherein N is equal to 4, the 4 transmission layers supported by the communication system are transmission layer 0, transmission layer 1, transmission layer 2, and transmission layer 3, the transmission layer 0 and transmission layer 1 are mapped to a first codeword, and the transmission layer 2 and transmission layer 3 are mapped to a second codeword.

18. The access network device according to claim 15, wherein each of the preset combinations items satisfies a third configuration condition; and the third configuration condition is that, in one of the predetermined combination items, if the spacing between CS resources corresponding to different transmission layers mapped to the same codeword is less than the spacing between CS resources corresponding to the transmission layers mapped to different codewords, then the different transmission layers mapped to the same codeword are configured with different OCC sequence.

19. The access network device according to claim 15, wherein the indication unit is further configured to trigger to indicate a DMRS sequence group hopping mode for the UE, by using the OCC sequences in the selected combinations;

wherein, if the OCC sequences in the selected combinations are same, it is indicating the UE to adopt the inter-subframe DMRS sequence group hopping mode, if the OCC sequences in the selected combinations are different, it is indicating the UE to adopt the inter-slot DMRS sequence group hopping mode.

20. A user equipment (UE), comprising a processor and a memory storing a program product for use by the processor, wherein the program product comprises the following functional units:

a receiving unit, configured to receive a control signaling from an access network device, wherein the control signaling comprises quantity of the transmission layers of the UE for transmitting uplink data, and an item number, wherein the item number corresponds to an combination item among a plurality of predetermined combination items, wherein the combination item comprises N combinations of a Cyclic Shift (CS) resource and an Orthogonal Cover Code (OCC) sequence, the N combinations correspond to N transmission layers supported by a communication system, wherein N is an integer larger than or equal to the quantity of transmission layers of the UE for transmitting uplink data; and wherein one combination is used for generating a DMRS sequence for each transmission layer of the UE;

a configuration determination unit, configured to determine a combination of a CS resource and an OCC sequence for each of the transmission layers of the UE for transmitting uplink data according to the control signaling; and a generation unit, configured to generate a DMRS sequence for each of the transmission layers of the UE by using the selected combination of the CS resource and the OCC sequence corresponding to the transmission layer; and a sending unit, configured to cause the DMRS sequences to be sent to the access network device, wherein the DMRS sequences are such that spacing between the CS resources for generating the DMRS sequences corresponding to transmission layers mapped to a same codeword is larger than spacing between the CS resources for generating the DMRS sequences corresponding to transmission layers mapped to different codewords.

21. The user equipment according to claim 20, wherein the predetermined combination items satisfy a first configuration condition; and the first configuration condition is that the OCC sequences in the at least two of the predetermined combination items having the same CS resources are different.

22. The user equipment according to claim 20, wherein each of the predetermined combinations items satisfies a second configuration condition; and the second configuration condition is that, in one of the predetermined combination items, the spacing between CS resources corresponding to the transmission layers mapped to the same codeword is greater than the spacing between CS resources corresponding to the transmission layers mapped to different codewords;

wherein N is equal to 4, the 4 transmission layers supported by the communication system are transmission layer 0, transmission layer 1, transmission layer 2, and transmission layer 3, the transmission layer 0 and transmission layer 1 are mapped to a first codeword, and the transmission layer 2 and transmission layer 3 are mapped to a second codeword.

23. The user equipment according to claim 20, wherein each of the preset combinations also satisfies a third configuration condition; and the third configuration condition is that, in one of the predetermined combination items, if the spacing between CS resources corresponding to different transmission layers mapped to the same codeword is less than the spacing between CS resources corresponding to the transmission layers mapped to different codewords, then the different transmission layers mapped to the same codeword are configured with different OCC sequence.

24. The user equipment according to claim 20, wherein the configuration determination unit is further configured to determine a DMRS sequence group hopping mode to be adopted, based on OCC sequences in the determined combinations;

wherein, if the OCC sequences corresponding to the respective transmission layers in the determined combinations are the same, determining an inter-subframe DMRS sequence group hopping mode to be adopted; if the OCC sequences corresponding to the respective transmission layers in the determined combinations are different, determining an inter-slot DMRS sequence group hopping mode to be adopted.

* * * * *